US011341781B2

(12) United States Patent
Williams et al.

(10) Patent No.: US 11,341,781 B2
(45) Date of Patent: May 24, 2022

(54) VEHICULAR COMMUNICATIONS THROUGH IDENTIFIERS AND ONLINE SYSTEMS

(71) Applicant: Toyota Motor Engineering & Manufacturing North America, Inc., Erlanger, KY (US)

(72) Inventors: Paxton Williams, Milan, MI (US); Danil Prokhorov, Canton, MI (US); Todd Muck, Fowlerville, MI (US)

(73) Assignee: TOYOTA MOTOR ENGINEERING AND MANUFACTURING NORTH AMERICA, INC., Plano, TX (US)

( * ) Notice: Subject to any disclaimer, the term of this patent is extended or adjusted under 35 U.S.C. 154(b) by 175 days.

(21) Appl. No.: 16/657,443

(22) Filed: Oct. 18, 2019

(65) Prior Publication Data

US 2021/0118243 A1    Apr. 22, 2021

(51) Int. Cl.
*G07C 5/00* (2006.01)
*G07C 5/08* (2006.01)
(Continued)

(52) U.S. Cl.
CPC ............ *G07C 5/008* (2013.01); *G05D 1/0088* (2013.01); *G07C 5/085* (2013.01); *H04W 4/44* (2018.02); *G05D 2201/0213* (2013.01)

(58) Field of Classification Search
CPC ....... H04L 67/12; H04L 67/10; H04L 63/102; H04L 67/306; H04L 63/0861;
(Continued)

(56) References Cited

U.S. PATENT DOCUMENTS 5,900,611 A    5/1999 Hecht
6,067,007 A    5/2000 Gioia
(Continued)

FOREIGN PATENT DOCUMENTS

KR    100247545 B1    4/2000
KR    WO20190006823 A    1/2019
(Continued)

OTHER PUBLICATIONS

Wang et al., "A Review on Cooperative Adaptive Cruise Control (CACC) Systems: Architectures, Controls, and Applicaitons," IEEE, 8 pages.
(Continued)

*Primary Examiner* — Alexander G Kalinowski
*Assistant Examiner* — Sanjeev Malhotra
(74) *Attorney, Agent, or Firm* — Jordan IP Law, LLC

(57) ABSTRACT

Methods and systems may provide for technology to identify, at a first vehicle, one or more driving factors associated with a potential future action of the first vehicle, determine that the one or more driving factors are to be stored as remotely accessible data and cause the remotely accessible data to be stored to an online storage in association with an identifier of the first vehicle. The technology may further, at a second vehicle, identify the identifier from sensor data, access the remotely accessible data based on the identifier, and one or more of cause at least part of the remotely accessible data to be presented to a user of the second vehicle or modify a driving parameter of the second vehicle based on the remotely accessible data.

9 Claims, 9 Drawing Sheets

(51) Int. Cl.
*H04W 4/44* (2018.01)
*G05D 1/00* (2006.01)

(58) Field of Classification Search
CPC ..... H04L 63/0428; H04L 63/10; H04L 51/18; H04L 51/32; H04L 63/062; H04L 63/08; H04L 63/083; H04L 63/0884; H04L 63/107; H04L 67/02; H04L 67/025; H04L 67/22; H04L 67/26; H04L 67/30; H04L 67/303; G06F 3/0488; G06F 21/32; G06F 21/31; G06F 16/25; G06F 16/583; G06F 16/951; G06F 21/00; G06F 3/017; G06F 3/0482; G06F 3/04842; G06F 3/167; G06F 9/451; G06F 3/0484; G06F 21/34; G06F 21/6245; G06F 21/629; G06F 2221/2141; G06F 3/048; G06F 3/04817; G06F 3/1454; H04W 12/06; H04W 4/44; H04W 12/088; H04W 12/08; H04W 36/34; H04W 48/04; H04W 4/12; H04W 4/21; H04W 4/40; H04W 4/60; H04W 84/005; H04W 12/68; H04W 4/02; H04W 4/029; H04W 4/48; H04W 4/80; H04W 36/0005; H04W 4/021; H04W 4/024; H04W 4/90; H04W 76/11; H04W 84/12; G06Q 10/02; G06Q 30/0639; G06Q 10/00; G06Q 10/20; G06Q 30/00; G06Q 30/012; G06Q 30/0265; G06Q 30/0633; G06Q 30/0645; G06Q 50/30; G06Q 10/10; G06Q 20/12; G06Q 20/308; G06Q 20/321; G06Q 20/322; G06Q 20/325; G06Q 20/40; G06Q 20/40145; G06Q 30/0207; G06Q 50/01; G06Q 50/265; B06Q 1/52; B60R 25/00; B60R 25/1004; B60R 25/25; G01C 21/26; G06K 2009/00939; G06K 9/00255; G06K 9/00268; G06K 9/00355; G06K 9/00832; G08B 13/19647; G08B 21/06; G08B 25/016; G08B 29/188; G08B 21/0205; G08G 1/096725; G08G 1/096741; G08G 1/096775; H04N 21/41422; H04N 7/181; G09G 2380/10; G09G 2354/00; G09G 5/14; B60K 2370/11; B60L 58/12; G07C 5/008; G07C 9/00563; H01M 2010/4278; H01M 2220/20; H05K 999/99; Y02E 60/10; Y02T 10/70; Y02T 90/16
USPC ......... 701/36, 48, 1, 2, 3, 23, 31.4; 345/1.1; 707/802; 700/276; 713/156; 705/44; 348/14.02; 180/167
See application file for complete search history.

(56) References Cited

U.S. PATENT DOCUMENTS

| | | | |
|---|---|---|---|
| 6,437,690 B1 | 8/2002 | Okezie | |
| 7,108,178 B1 | 9/2006 | Choi | |
| 7,426,480 B2 | 9/2008 | Granger et al. | |
| 7,603,235 B2* | 10/2009 | Makela | G05D 1/028 180/167 |
| 7,899,621 B2 | 3/2011 | Breed et al. | |
| 8,036,788 B2 | 10/2011 | Breed | |
| 8,577,534 B2* | 11/2013 | Dorenkamp | G01S 7/40 701/23 |
| 9,367,860 B2 | 6/2016 | Mckirdy | |
| 2005/0165684 A1* | 7/2005 | Jensen | G06Q 20/40145 705/44 |
| 2005/0173524 A1 | 8/2005 | Schrader | |
| 2006/0190124 A1* | 8/2006 | Makela | G05D 1/028 700/213 |
| 2008/0149721 A1 | 6/2008 | Shadwell | |
| 2008/0154629 A1 | 6/2008 | Breed et al. | |
| 2010/0332068 A1* | 12/2010 | Dorenkamp | G01S 7/40 701/31.4 |
| 2011/0042462 A1 | 2/2011 | Smith | |
| 2012/0022747 A1* | 1/2012 | Zagorski | B60T 8/172 701/48 |
| 2012/0035788 A1* | 2/2012 | Trepagnier | B60W 10/20 701/3 |
| 2012/0130562 A1* | 5/2012 | Brand | B61L 15/0027 701/2 |
| 2012/0136510 A1* | 5/2012 | Min | G01S 17/88 701/2 |
| 2012/0158792 A1* | 6/2012 | MacLaurin | G06F 21/6245 707/802 |
| 2013/0066667 A1 | 3/2013 | Gulee et al. | |
| 2013/0325629 A1 | 12/2013 | Harrison | |
| 2014/0309789 A1* | 10/2014 | Ricci | H04W 4/21 700/276 |
| 2014/0309814 A1* | 10/2014 | Ricci | B60R 25/00 701/2 |
| 2014/0309871 A1* | 10/2014 | Ricci | B60R 25/00 701/36 |
| 2014/0368601 A1* | 12/2014 | deCharms | H04L 67/26 348/14.02 |
| 2015/0178034 A1* | 6/2015 | Penilla | G06Q 30/0226 345/1.1 |
| 2015/0243172 A1* | 8/2015 | Eskilson | B60W 40/08 701/1 |
| 2016/0127358 A1* | 5/2016 | Engelking | H04L 63/0823 713/156 |
| 2016/0368456 A1 | 12/2016 | Outwater et al. | |
| 2017/0041271 A1* | 2/2017 | Tai | H04L 43/065 |
| 2017/0041304 A1* | 2/2017 | Tai | H04W 12/08 |
| 2018/0009417 A1* | 1/2018 | Hoyos | B60R 25/25 |
| 2018/0012324 A1* | 1/2018 | Kelts | G06F 21/34 |
| 2018/0114010 A1* | 4/2018 | Van Os | H04W 12/06 |
| 2018/0123998 A1* | 5/2018 | Gurung | H04L 51/32 |
| 2018/0212942 A1* | 7/2018 | Lindquist | H04L 63/062 |
| 2019/0066399 A1* | 2/2019 | Jiang | G07C 5/006 |
| 2019/0137992 A1* | 5/2019 | Rasmussen | G01C 21/3415 |
| 2019/0279744 A1* | 9/2019 | Howley | G06F 21/6245 |
| 2019/0385096 A1* | 12/2019 | Ibrahim | G07F 17/0014 |
| 2020/0057783 A1* | 2/2020 | Ricci | G01C 21/3484 |
| 2020/0068400 A1* | 2/2020 | Ramic | H04W 4/40 |
| 2020/0100078 A1* | 3/2020 | Boehm | H04L 67/30 |
| 2020/0126505 A1* | 4/2020 | Kumamoto | G06F 3/14 |
| 2020/0204534 A1* | 6/2020 | Beecham | H04L 63/083 |
| 2020/0285761 A1* | 9/2020 | Buck | G06F 21/629 |
| 2020/0322800 A1* | 10/2020 | Ozanian | H04L 63/102 |
| 2020/0348906 A1* | 11/2020 | Barnes, Jr. | G06Q 20/20 |
| 2020/0380972 A1* | 12/2020 | Carrigan | G06F 9/451 |
| 2021/0114482 A1* | 4/2021 | Penilla | G06F 3/1454 |

FOREIGN PATENT DOCUMENTS

| | | |
|---|---|---|
| WO | 201 3072926 A2 | 5/2013 |
| WO | WO2017040924 A1 | 3/2017 |

OTHER PUBLICATIONS

Zhang et al., "SBVLC: Secure Barcode-based Visible Light Communication for Smartphones," IEEE Conference on Computer Communications, 2014, 9 pages.

* cited by examiner

VEHICULAR COMMUNICATIONS THROUGH IDENTIFIERS AND ONLINE SYSTEMS

TECHNICAL FIELD

Embodiments generally relate to vehicular communications. More particularly, embodiments relate to vehicle communications through identifiers and online systems.

BACKGROUND

Vehicular communications may be used to communicate various types of information. While vehicular communications are useful in many ways, the utility of such vehicular communications may be hampered due to latency and the amount of information that may be conveyed. For example, a vehicle may analyze the brake lights of surrounding vehicles through image recognition techniques to determine when the vehicles are braking. Doing so however incurs latency in that such a process in multi-staged. For example, a vehicle may initiate a brake process (e.g., depress brake pedal), then the brake light may illuminate, another vehicle may register the illumination through image recognition techniques, analyze the illumination, determine that the vehicle is braking and react accordingly. Moreover, such a multi-staged process may be prone to error at each stage.

Furthermore, such a system is reactively driven rather than proactively driven. That is, vehicular communications may be driven through communications that occur as an action occurs, rather than communications that occur before such an action occurs. Such a system is prone to error, leaves minimal time for adjustments and is inefficient.

BRIEF SUMMARY

In some embodiments a system comprises a first vehicle associated with a first user and including an identifier that is associated with an online storage, and a first control system including at least one first processor and at least one first memory having a set of instructions, which when executed by the at least one first processor, cause the first control system to identify one or more driving factors associated with a potential future action of the first vehicle, determine that the one or more driving factors are to be stored as remotely accessible data, and cause the remotely accessible data to be stored to the online storage in association with the identifier of the first vehicle. The system further comprises a second vehicle including one or more sensors to sense the identifier, a second control system coupled to the one or more sensors, wherein the second control system includes at least one second processor and at least one second memory having a set of instructions, which when executed by the at least one second processor, cause the second control system to access the remotely accessible data on the online storage based on the sensed identifier, and one or more of cause at least part of the remotely accessible data to be presented to a second user of the second vehicle or modify a driving parameter of the second vehicle based on the remotely accessible data.

Some embodiments include at least one computer readable storage medium comprising a set of instructions, which when executed by a control system of a vehicle, cause the control system to identify one or more driving factors associated with a potential future action of the vehicle, determine that the one or more driving factors are to be stored as remotely accessible data, and cause the remotely accessible data to be stored to an online storage in association with an identifier of the vehicle.

Some embodiments include a vehicle comprising an identifier that is associated with an online storage, and a control system including at least one processor and at least one memory having a set of instructions, which when executed by the at least one processor, cause the control system to identify one or more driving factors associated with a potential future action of the vehicle, determine that the one or more driving factors are to be stored as remotely accessible data, and cause the remotely accessible data to be stored to the online storage in association with the identifier of the vehicle.

Some embodiments include at least one computer readable storage medium comprising a set of instructions, which when executed by a control system of a data-responsive vehicle, cause the control system to identify an identifier of another vehicle from sensor data, access remotely accessible data, which is stored on an online storage, based on the identifier, wherein the remotely accessible data is to include one or more driving factors associated with a potential future action of the other vehicle, and one or more of cause at least part of the remotely accessible data to be presented to a user of the data-responsive vehicle or modify a driving parameter of the data-responsive vehicle based on the remotely accessible data.

Some embodiments include a data-responsive vehicle including one or more sensors to generate sensor data, and a control system coupled to the one or more sensors, wherein the control system includes at least one processor and at least one memory having a set of instructions, which when executed by the at least one processor, cause the control system to identify an identifier of another vehicle from the sensor data, access remotely accessible data, which is stored on an online storage, based on the identifier, wherein the remotely accessible data is to include one or more driving factors associated with a potential future action of the other vehicle, and one or more of cause at least part of the remotely accessible data to be presented to a user of the data-responsive vehicle or modify a driving parameter of the data-responsive vehicle based on the remotely accessible data.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
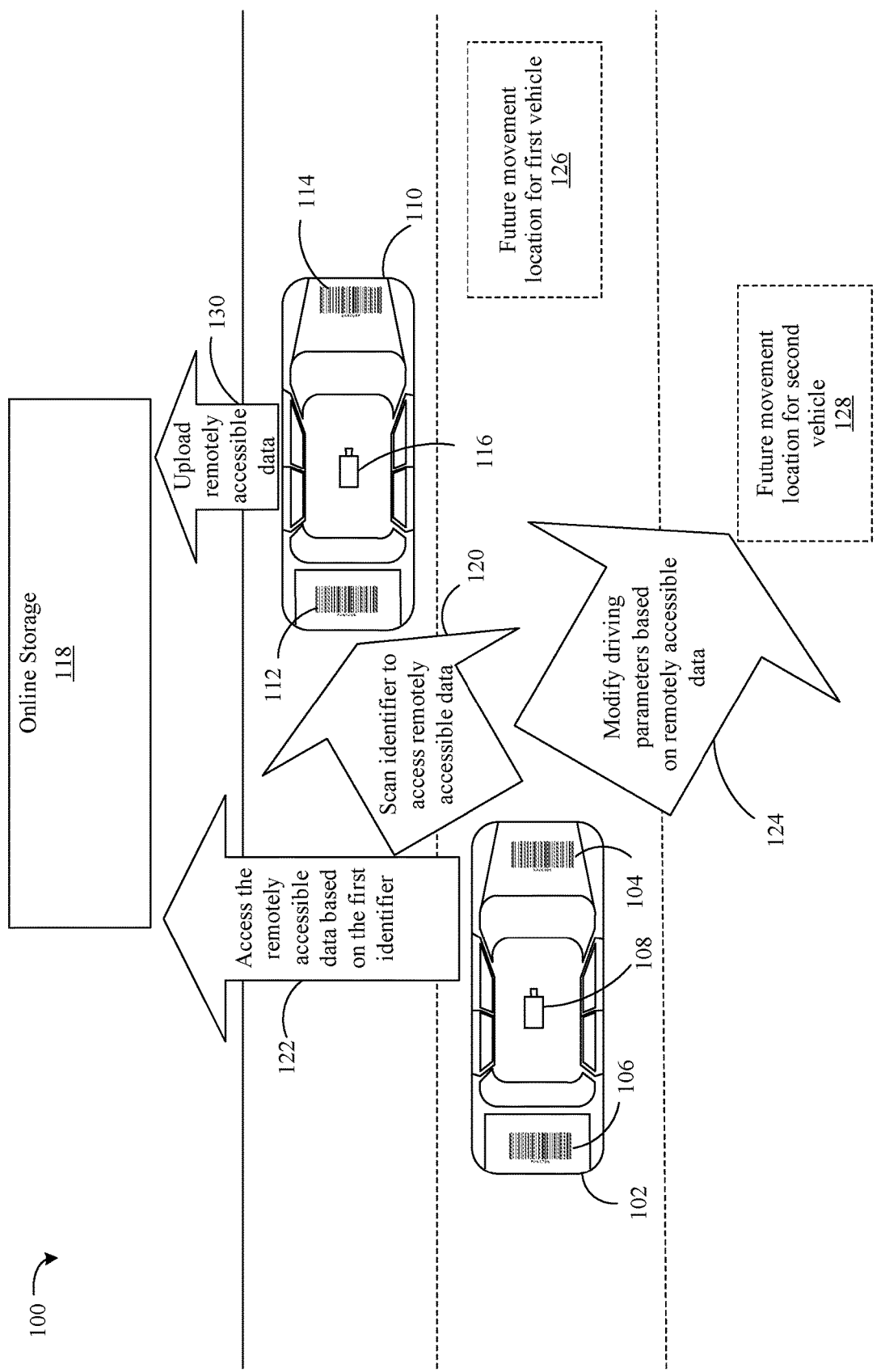
FIG. 1 is a diagram of an example of a vehicle communication and adjustment scenario according to an embodiment.

Turning now to FIG. 1, a proactive vehicle communication and adjustment process 100 is shown in which a first vehicle 110 and second vehicle 102 are proximate each other. The second vehicle 102 may be in a middle lane of a roadway. The first vehicle 110 may be in a leftmost lane of the roadway. As will be explained in further detail, the second vehicle 102 may scan an identifier 112 (e.g., a barcode such as a 3D barcode or 2D barcode, quick response (QR) code or other unique identifier) on the first vehicle 110, retrieve remotely accessible data associated with the first vehicle 110 based on the identifier from an online storage 118. The remotely accessible data may include one or more driving factors associated with a potential future action of the first vehicle 110 (e.g., future driving parameters). The second vehicle 102 may present at least part of the remotely accessible data to a user (e.g., driver) of the second vehicle 102 and/or adjust one or more driving parameters based on the remotely accessible data. In doing so, latency of communications between the first and second vehicles 110, 102 is reduced, safety may be enhanced, and relevant data may be retrieved.

In further detail, the first vehicle 110 may upload the remotely accessible data 130 to the online storage 118. The online storage 118 may be a server, cloud-based system or any computing device that is remotely accessible. The first vehicle 110 may be connected to the online storage 118 through a wireless medium, such as the internet. Likewise, the second vehicle 102 may be connected to the online storage 118 through the wireless medium.

The remotely accessible data may include data that is related to future movements of the first vehicle 110 (e.g., potential future actions). For example, the remotely accessible data may include a future movement location for the first vehicle 126. The future movement location of the first vehicle 126 may be predicted based on navigation directions (e.g., driving directions from a global-positioning based system), and/or a manual input from a first user (e.g., a driver) of the first vehicle 110. In some embodiments, the first vehicle 110 may be an autonomous driving vehicle that generates directions and automatically moves a vehicle. That is, in some embodiments, the first vehicle 110 identifies one or more first vehicle specific actions (that may be generated as part of the autonomous driving process) that automatically control a movement of the first vehicle 110. The one or more first vehicle specific actions may be uploaded to the online storage 118 as part of the remotely accessible data. Regardless of how the future movement location for the first vehicle 126 is identified, the location may be uploaded to the online storage 118 as part of the remotely accessible data.

The remotely accessible data may include other vehicle driven data, for example a current speed of the first vehicle 110, a future speed of the first vehicle 110, a current position of the first vehicle 110, a future navigational course for the first vehicle 110 (e.g., a predetermined number of directions, etc.). Thus, the remotely accessible data may include various types of data depending on the context and authorizations provided by the first user. For example, the first user may authorize a predetermined number of navigation directions to be uploaded to the online storage 118, a future speed of the first vehicle 110, a current turning radius of the first vehicle 110 and any other factors which may affect the drive ability of the first vehicle 110. That is, the first user may specifically authorize the remotely accessible data before the remotely accessible data is stored onto the online storage 118. Data may not be uploaded to the online storage 118 if the first user does not authorize the data to be uploaded to the online storage 118.

The second vehicle 102 may scan an identifier 112 to access the remotely accessible data 120. For example, the first and second vehicles 110, 102 may include sensors 108, 116 to sense an area surrounding the first and second vehicles 110, 102. In detail, the second vehicle 102 may detect the identifier 112 with the sensor 108 (e.g., an imaging sensor, LIDAR sensor, etc.). The sensors 108, 116 may be of various types of sensors that are able to sense identifiers such as identifier 112.

The second vehicle 102 may access the remotely accessible data based on the first identifier 122. For example, the second vehicle 102 may utilize image recognition techniques to identify the first identifier 112. The second vehicle 102 may decode the first identifier 112 to identify a location of the online storage 118 (e.g., an HTML address or website). For example, if the identifier 112 is a QR code, the QR code may direct the second vehicle 102 to access a website in order to retrieve the remotely accessible data from the online storage 118. The QR code may include data beyond an HTML website to access the remotely accessible data, such as for example log-in credentials to access data associated with the first vehicle 110.

The second vehicle 102 may access the remotely accessible data stored on the online storage 118 through the above described process. The second vehicle 102 may then analyze the remotely accessible data to determine a future driving parameter of the second vehicle 102. In the present example, the first vehicle 110 may move from the left lane to the middle lane as indicated by the future movement location for the first vehicle 126. The remotely accessible web data may reflect the movement of the first vehicle 110 to the middle lane. The remotely accessible web data may further identify other future driving parameters of the first vehicle 110, such as future velocity, whether brakes will be applied, a distance and/or time that the first vehicle 110 will travel in the middle lane, navigation directions, etc. Thus, the second vehicle 102 may quickly analyze the remotely accessible web data to ascertain that the first vehicle 110 is going to change lanes to move the first vehicle 110 directly in front of the second vehicle 102, and reduce the velocity of the first vehicle 110 so that the second vehicle 102 will have a greater velocity than the first vehicle 110.

The second vehicle 102 may therefore modify driving parameters based on the remotely accessible data 124 to change lanes from the middle lane to the right most lane. That is, the second vehicle 102 may move to the future of movement location for the second vehicle 128. In doing so, the second vehicle 102 may avoid a potential collision with the first vehicle 110 as the first vehicle 110 is projected to move into the middle lane. Thus, the above process 100 may allow the second vehicle 102 to quickly and efficiently ascertain future movements of the first vehicle 110 and proactively act based upon the future movements of the first vehicle 110. Thus, the second vehicle 102 may not be limited to identifying movements of the first vehicle 110 based on visible indicators on the first vehicle 110 (e.g., turn signals, brake lights etc.) but may identify future driving parameters of the first vehicle 110 from the remotely accessibly web data even before a physical indicator is presented to the second vehicle 102.

Further, the above process 100 may rely on a targeted approach to facilitate communication. In contrast, other designs may rely on broadcasting data to all surrounding users regardless of the relevancy of the data. Doing so may be inefficient and consume power as all surrounding users would need to filter the data to identify whether the data is relevant. In contrast, the second vehicle 102 may identify that the first vehicle 110 is within a predetermined distance of the second vehicle 102, and therefore access the online storage 118 to determine whether the first vehicle 110 will take an action that may affect the second vehicle 102. The second vehicle 102 may not only initiate such a process with respect to first vehicle 110 but may execute a similar such process to retrieve data of other surrounding vehicles to the side and behind of the second vehicle 102.

Furthermore, in some embodiments, the second vehicle of 102 may selectively retrieve only relevant data of their remotely accessible data. For example, the first vehicle 110 may upload irrelevant data that is irrelevant to the second vehicle 102. For example, the irrelevant data may include directions of the first vehicle 110 which will occur after the second vehicle 102 will exit the roadway. The second vehicle 102 may identify that the remotely accessible data includes the irrelevant data, and only retrieve the relevant data that includes directions up until the second vehicle 102 exits the roadway.

In some embodiments, the online storage 118 may identify the relevant data. For example, the second vehicle 102 may upload navigation directions of the second vehicle 102 (e.g., similar to the above discussion) to the online storage 118. The second vehicle 102 may request the remotely accessible data of the first vehicle 110. The online storage 118 may determine from the navigation directions of the second vehicle 102, that the second vehicle will exit the roadway shortly. As a result, the online storage 118 may only provide the relevant data of the remotely accessible data of the first vehicle 110 that includes the future directions of the first vehicle 110 up until the second vehicle 102 exits the highway. In doing so, bandwidth, processing power and resources may be saved by reducing transmission sizes and limiting the amount of data that the online storage 118 analyzes for relevancy. For example, the online storage 118 may determine that all directions of the first vehicle 110 after the second vehicle 102 exits the highway are irrelevant without analyzing each individual direction for relevancy (e.g., make one decision regarding a plurality of decisions rather than individual decisions). Thus, the online storage 118 may compare remotely accessible data uploaded by the first vehicle 110 and the remotely accessible data uploaded by the second vehicle 102 to determine relevant data to provide to the second vehicle 102.

As illustrated, the first vehicle 110 has two identifiers 112, 114. In some embodiments, the first vehicle 110 may include more than the two identifiers 112, 114 or less as needed. Furthermore, the identifiers 112, 114 may be of any type such as for example QR codes, bar codes, etc. The second vehicle 102 may include two identifiers 106, 104 to facilitate communication with the first vehicle 110. While not illustrated, the second vehicle 102 may upload data to an online storage as well and operate similarly to as described with the first vehicle 110.

As illustrated above, the second vehicle 102 may adjust driving parameters based on the remotely accessible data 124 of the first vehicle 110. In doing so, the second vehicle 102 changes lanes to the future movement location for the second vehicle 128. In some embodiments, the driving parameters may further include other aspects, such as an auditory parameter, a visual parameter, a velocity parameter, an acceleration parameter and a sensing parameter. For example, in addition to or instead of changing lanes, the second vehicle 102 may adjust the driving parameters to accelerate, decelerate, provide an audio signal (e.g., honking a horn, increase the running speed of an engine and/or increase the engine speed), provide a visual cue to the first vehicle 110 (e.g., oscillating between a bright light setting and regular light setting of headlights). Furthermore, the second vehicle 102 may adjust a sensing parameter to reallocate resources towards observing the first vehicle 110. For example, the second vehicle 102 may determine that the future movement location for the first vehicle 126 will be within a predetermined proximity of the second vehicle 102, and therefore that the second vehicle 102 should prioritize all sensors (e.g., process data from the sensors first) that are able to sense the first vehicle 110 over other sensors (e.g., process data from the other sensors last) that are unable to sense the first vehicle 110 or are less accurate. In doing so, the second vehicle 102 may effectively prioritize accurate sensing of the first vehicle 110 over other performance parameters. As such, process 100 may provide an enhanced process to allow for vehicle communications with reduced latency and enhanced efficiency to form a proactive decision-making process that addresses potential actions before the actions occur.

Figure 2:
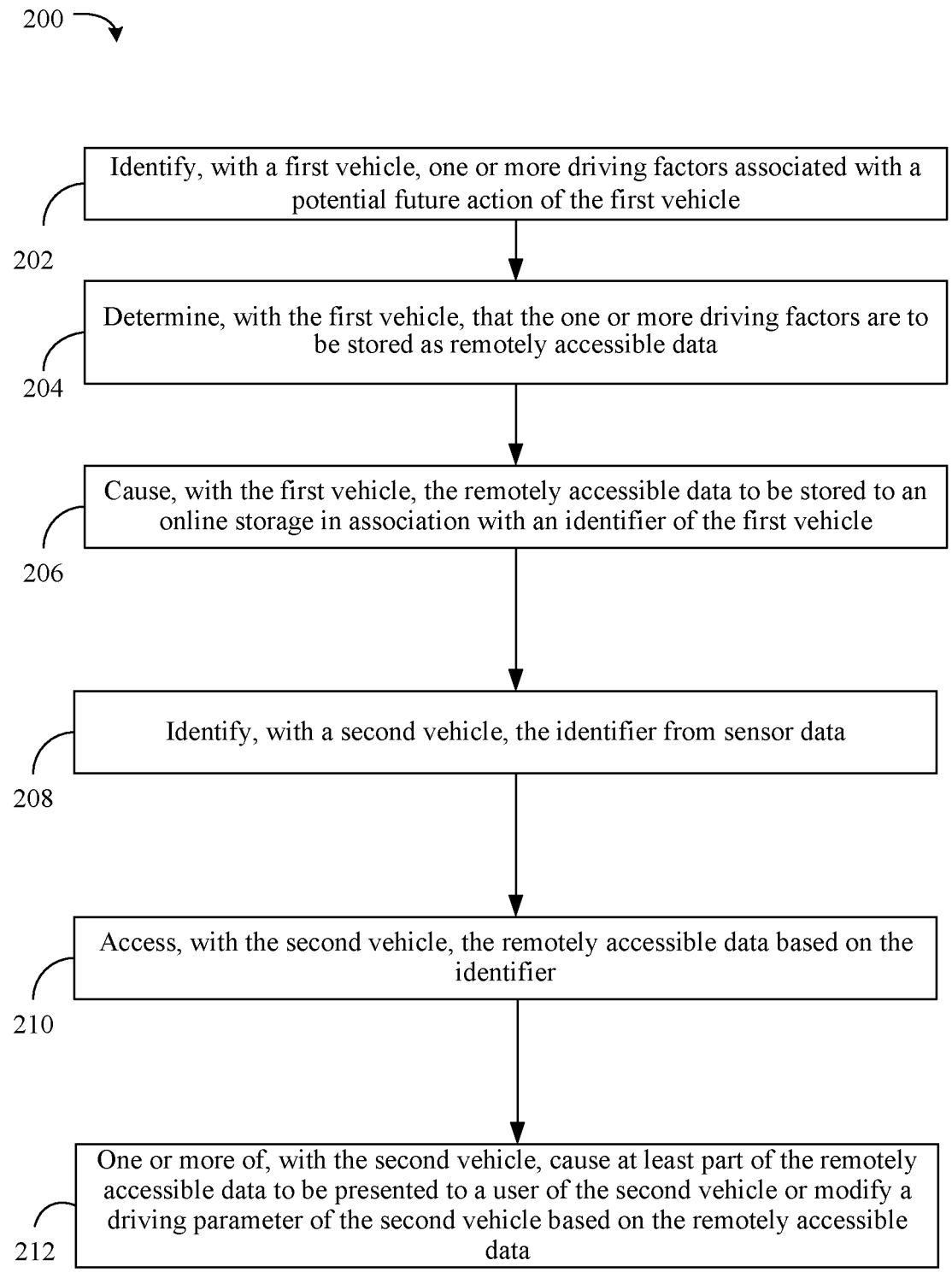
FIG. 2 is a flowchart of an example of a method of uploading and utilizing remotely accessible data according to an embodiment.

FIG. 2 shows a method 200 of uploading remotely accessible data and utilizing the remotely accessible data. The method 200 may generally be implemented in conjunction with any of the embodiments described herein, for example the process 100 of FIG. 1. In an embodiment, the method 200 is implemented in logic instructions (e.g., software), configurable logic, fixed-functionality hardware logic, circuitry, etc., or any combination thereof.

Illustrated processing block 202 identifies, with a first vehicle, one or more driving factors associated with a potential future action of the first vehicle. Illustrated processing block 204 determines, with the first vehicle, that the one or more driving factors are to be stored as remotely accessible data. Illustrated processing block 206 causes, with the first vehicle, the remotely accessible data to be stored to an online storage in association with an identifier of the first vehicle. Illustrated processing block 208 identifies, with a second vehicle, the identifier from sensor data. Illustrated processing block 210 accesses, with the second vehicle, the remotely accessible data based on the identifier. Illustrated processing block 212 one or more of causes, with the second vehicle, at least part of the remotely accessible data to be presented to a user of the second vehicle or modifies, with the second vehicle, a driving parameter of the second vehicle based on the remotely accessible data.

Figure 3:
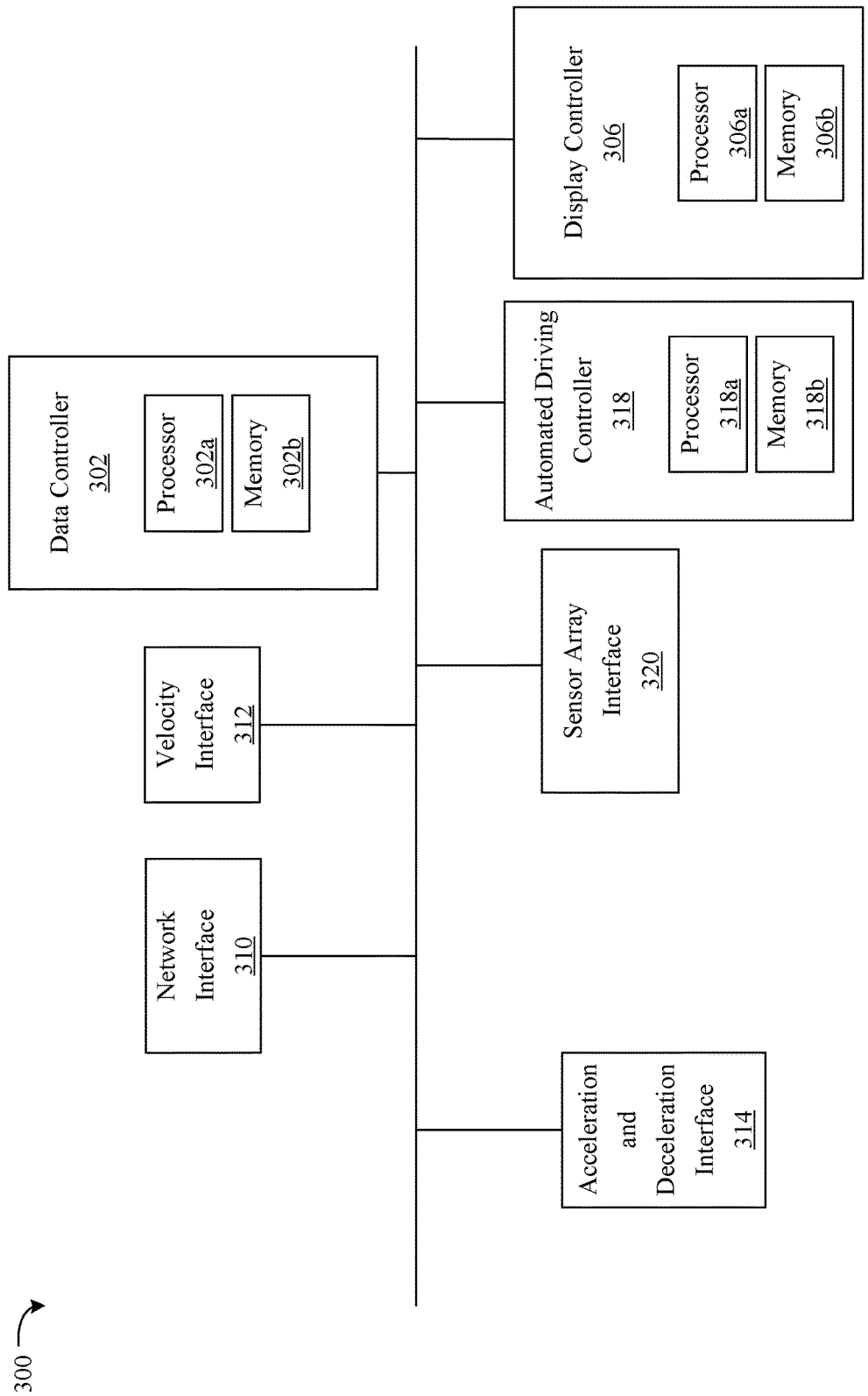
FIG. 3 is a block diagram of an example of a control system according to an embodiment.

FIG. 3 shows a more detailed example of a control system 300 (which may be referred to as a controller for brevity) to control uploading of first remotely accessible data of a first vehicle, control driving parameters of the first vehicle based on second remotely accessible data of a second vehicle and control a display based on the based on the second remotely accessible data. The illustrated control system 300 may be readily implemented in the vehicle 102 and/or vehicle 110 to execute process 100 (FIG. 1) and may implement the method 200 (FIG. 2), already discussed.

In the illustrated example, the control system 300 may include a network interface 310. The network interface 310 may allow for communications between the first vehicle and remote systems (e.g., a server) to retrieve the second remotely accessible data and upload the first remotely accessible data. The network interface 310 may operate over various wireless communications. The control system 300 may include a velocity interface 312 to interface with various components of the first vehicle to detect a velocity of the first vehicle. The control system 300 may include an acceleration and deceleration interface 314 that interfaces with various components of the first vehicle to detect an acceleration or deceleration of the first vehicle. The control system 300 may include a sensor array interface 320 to interface with sensors of the first vehicle to detect environmental conditions of the first vehicle.

The control system 300 may include a data controller 302 to control data that is to be uploaded as first remotely accessible data, an automated driving controller 318 to control automated driving of the first vehicle and a display controller 306 to control a display of the first vehicle. The data controller 302 may control the remotely accessible data based on various factors, such as user privacy settings, relevance of data (e.g., only relevant data is uploaded), and so forth.

The automated driving controller 318 may control driving parameters of the first vehicle (e.g., acceleration, deceleration, velocity, position, etc.) based on the second remotely accessible data retrieved by the network interface 310 and sensor data from the sensor array interface 320. The display controller 306 may modify a display of the first vehicle based on the second remotely accessible data for example to display a personalized message meant for a user of the first vehicle. In some embodiments, a warning may also be provided instead of or in addition to the above. For example, if a vehicle does not include an automated driving function, a warning may be provided to the user to notify them of surrounding vehicles actions and based on the second remotely accessible data.

Additionally, the data controller 302 may include a processor 302a (e.g., embedded controller, central processing unit/CPU, circuitry, etc.) and a memory 302b (e.g., non-volatile memory/NVM and/or volatile memory) containing a set of instructions, which when executed by the processor 302a, cause the data controller 302 to control the first remotely accessible data as described herein. Additionally, the automated driving controller 318 may include a processor 318a (e.g., embedded controller, central processing unit/CPU, circuitry, etc.) and a memory 318b (e.g., non-volatile memory/NVM and/or volatile memory) containing a set of instructions, which when executed by the processor 318a, cause the automated driving controller 318 to control automated driving as described herein. Further, the display controller 306 may include a processor 306a (e.g., embedded controller, central processing unit/CPU, circuitry, etc.) and a memory 306b (e.g., non-volatile memory/NVM and/or volatile memory) containing a set of instructions, which when executed by the processor 306a, cause the display controller 306 to control the display as described herein.

Figure 4:
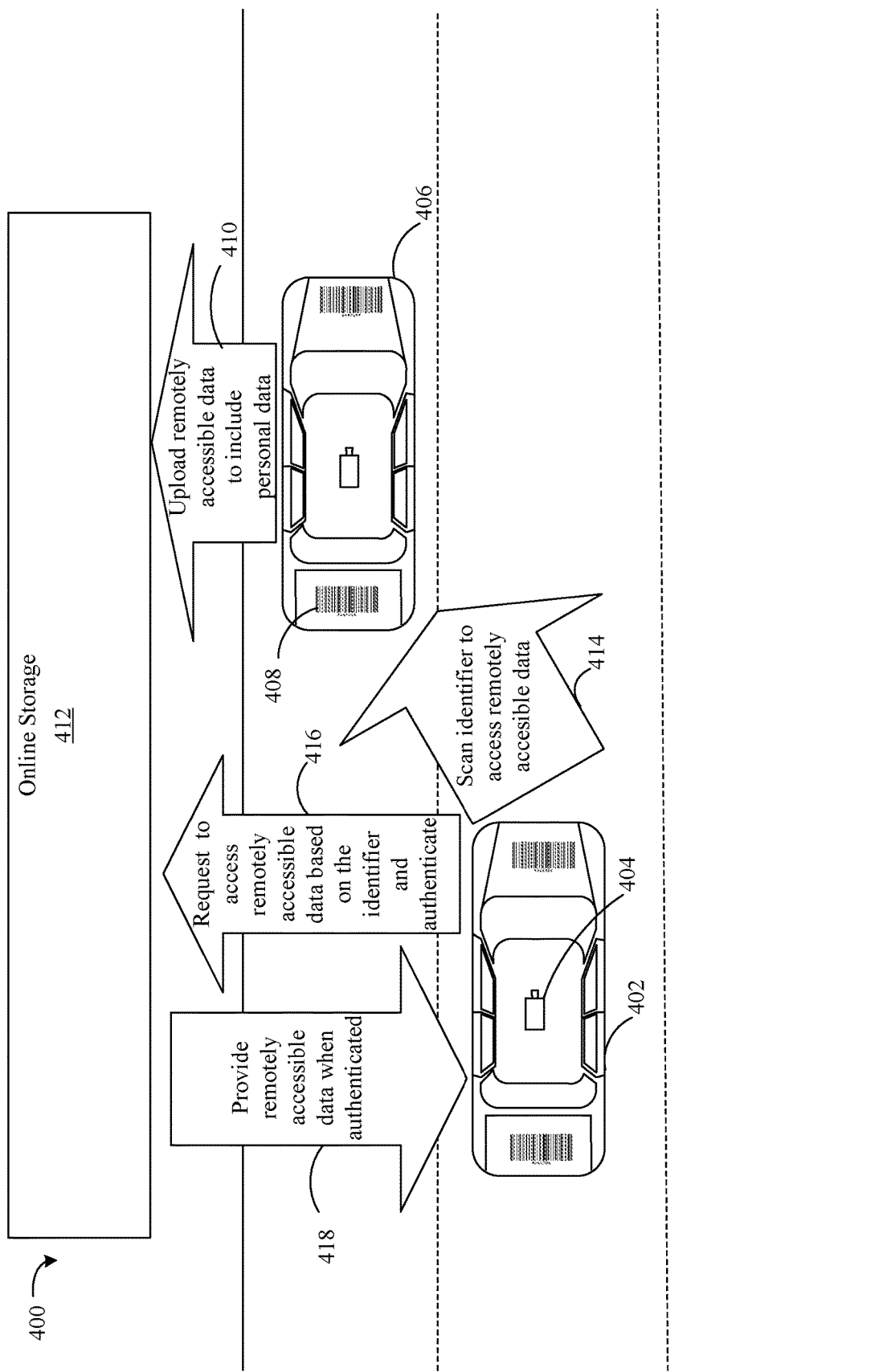
FIG. 4 is a diagram of an example of a security enhanced data sharing process according to an embodiment.

FIG. 4 illustrates a security enhanced data sharing process 400 in which a first vehicle 406 and a second vehicle 402 are travelling along a roadway. It should be noted that similar components and processes to those as already described will be omitted for brevity. Further, it should be noted that the embodiments of FIG. 4 are combinable with any of the embodiments described herein, for example the process 100 of FIG. 1, the method 200 of FIG. 2 and the control system 300 of FIG. 3.

The first vehicle 406 may upload remotely accessible data to include personal data 410. For example, the personal data may include a name of a first user of the first vehicle 406, social networking profiles of the first user, historical driving records of the first user, a personal message of the first user, etc. The historical driving records may include a long-term accumulation of actions and inactions taken by the first user while driving. Regardless of the specific nature of the personal data, the first user may desire that an authentication process is required to access the personal data.

The second vehicle 402 may scan the identifier 408 to access the remotely accessible data 414. As already described herein, the identifier may provide a specific location to access the locally accessible data such as a website online storage address and so forth. The second vehicle 402 may scan the identifier 408 with a sensor 404 of the second vehicle 402.

The second vehicle 402 may issue a request to access the remotely accessible data based on the identifier and authenticate 416. For example, the identifier may provide an online location to access the remotely accessible data. Once the online storage 412 detects an attempt to access the location by the second vehicle 402, the online storage 412 may request that the second vehicle 402 executes an authentication process to authenticate the second vehicle 402 or a user of the second vehicle 402 and grant permission before releasing the remotely accessible web data to the second vehicle 402. For example, the online storage 412 may request that the second vehicle 402 provides a username and password to authenticate. If the username and password match an authorized username and password, the second vehicle 402 may access the online storage. In some embodiments, the second vehicle 402 may provide credentials to the online storage 412 so that the online storage 412 may track all users who access remotely accessible data. In some embodiments, the second vehicle 402 may need to answer several questions to authenticate, such as whether the remotely accessible data will be utilized for an authorized purpose (e.g., control automated driving) rather than an illicit purpose such as tracking of the first user for marketing purposes.

The online storage 412 may provide the remotely accessible data when authenticated 418. That is, once the second vehicle 402 authenticates itself (e.g., completes the authentication process), the online storage 412 may provide the remotely accessible data to the second vehicle 402. For example, the second vehicle 402 accesses the personal message when the permission is granted by the online storage 412. The second vehicle 402 may present the personal message to the user of the second vehicle 402.

In some embodiments, the first user may indicate that a portion of their remotely accessible data is personal data while another portion of the remotely accessible data is public data. In such embodiments, if the second vehicle 402 authenticates itself, both the personal and public data may be provided directly to the second vehicle 402. If, however the second vehicle 402 does not authenticate itself successfully, the private data may be blocked from the second vehicle 402 while the public data may be transmitted to the second vehicle 402. That is, there may not be an authentication requirement for public data of the remotely accessible data, but an authentication process may need to be executed to release private data of the remotely accessible data.

Figure 5:
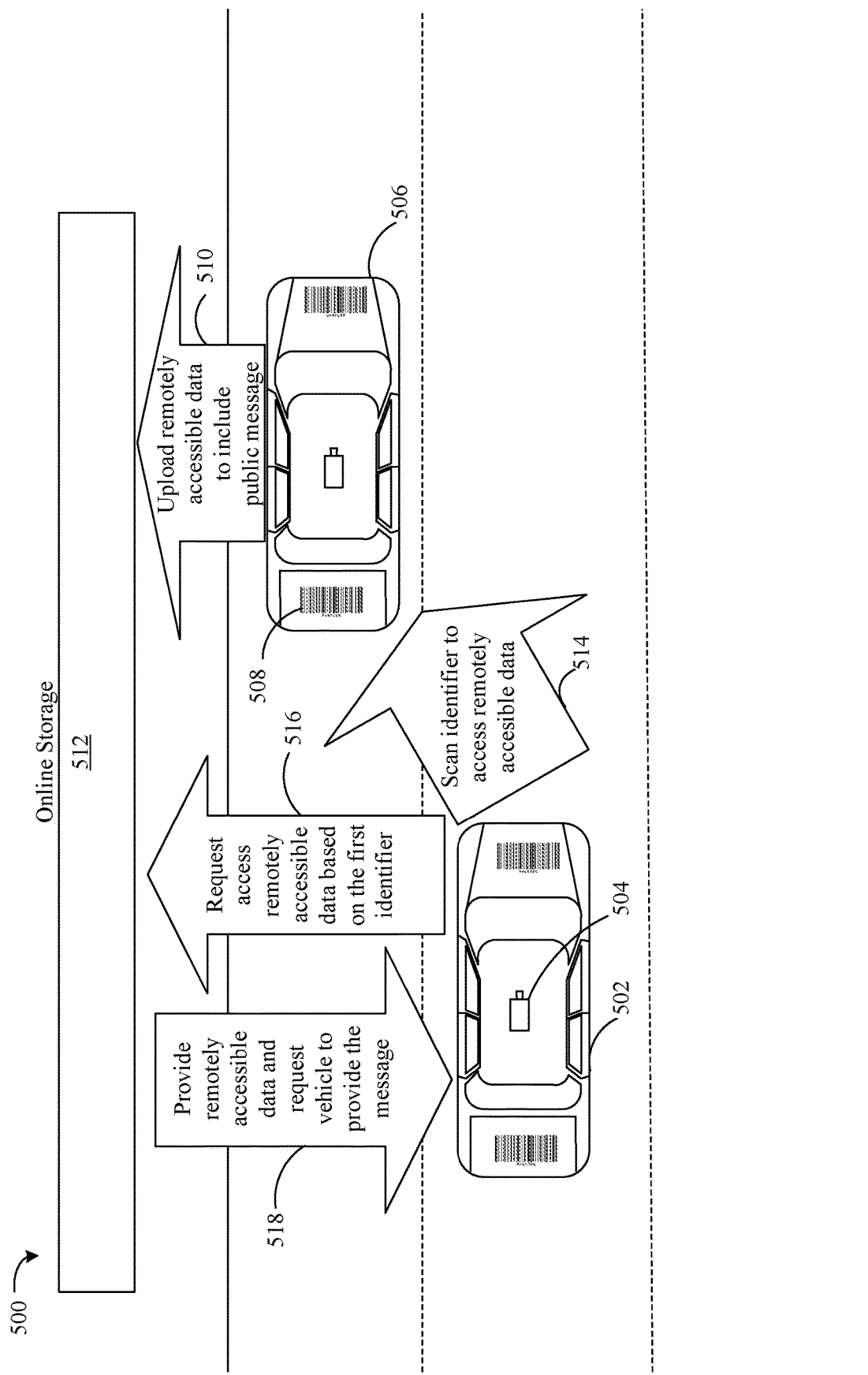
FIG. 5 is a diagram of an example of a message sharing process according to an embodiment.

FIG. 5 illustrates a message sharing process 500 in which a first vehicle 506 and a second vehicle 502 are travelling along a roadway. It should be noted that similar components and processes to those as already described will be omitted for brevity. Further, it should be noted that the embodiments of FIG. 5 are combinable with any of the embodiments described herein, for example the process 100 of FIG. 1, the method 200 of FIG. 2, the control system 300 of FIG. 3 and the process 400 of FIG. 4.

The first vehicle 506 may upload remotely accessible data to include a public message 510. For example, the public message may be an advertisement for a company, a public statement by a first user (e.g., "please vote for me during elections," "on my way to hospital for emergency, please excuse my driving," "I am hard of hearing," etc.) of the first vehicle 506, a request by the first user (e.g., "I need to make the next left turn, can you please let me in?") and so forth. Regardless of the specific nature of the message, the message may be authorized for public release by the first user and/or originate with the first user (e.g., the first user generates the message).

The second vehicle 502 may scan the identifier 508 to access the remotely accessible data 514. For example, the second vehicle 502 may utilize sensor 504 to scan the identifier 508. The second vehicle 502 may analyze the identifier 508 to determine how to access the remotely accessible data as already described herein. The second vehicle 502 may request access to the remotely accessible data based on the first identifier 508, 516. The online storage 512 may determine that the remotely accessible data includes a public message, and therefore no authentication is needed. Therefore, the online storage 512 may provide the remotely accessible data and a request to the second vehicle 502 to provide the message 518 to occupants of the second vehicle 502. For example, if the personal message is an advertisement, the second vehicle 502 may automatically cause the advertisement to be displayed on a display screen of the second vehicle 502 so that a second user of the second vehicle 502 may view the advertisement. In some embodiments, the second vehicle 502 may cause the advertisement to be displayed through a device of the second user, such as a mobile device. For example, the second vehicle 502 may provide the advertisement to the device and cause the device to display the advertisement.

In some embodiments, the second vehicle 502 may provide an audio output with the message. For example, if the message is in a text format, the second vehicle 502 may determine that the message maybe provided in an audio output rather than a visual output so that the second user is not distracted by the visual output.

Figure 6:
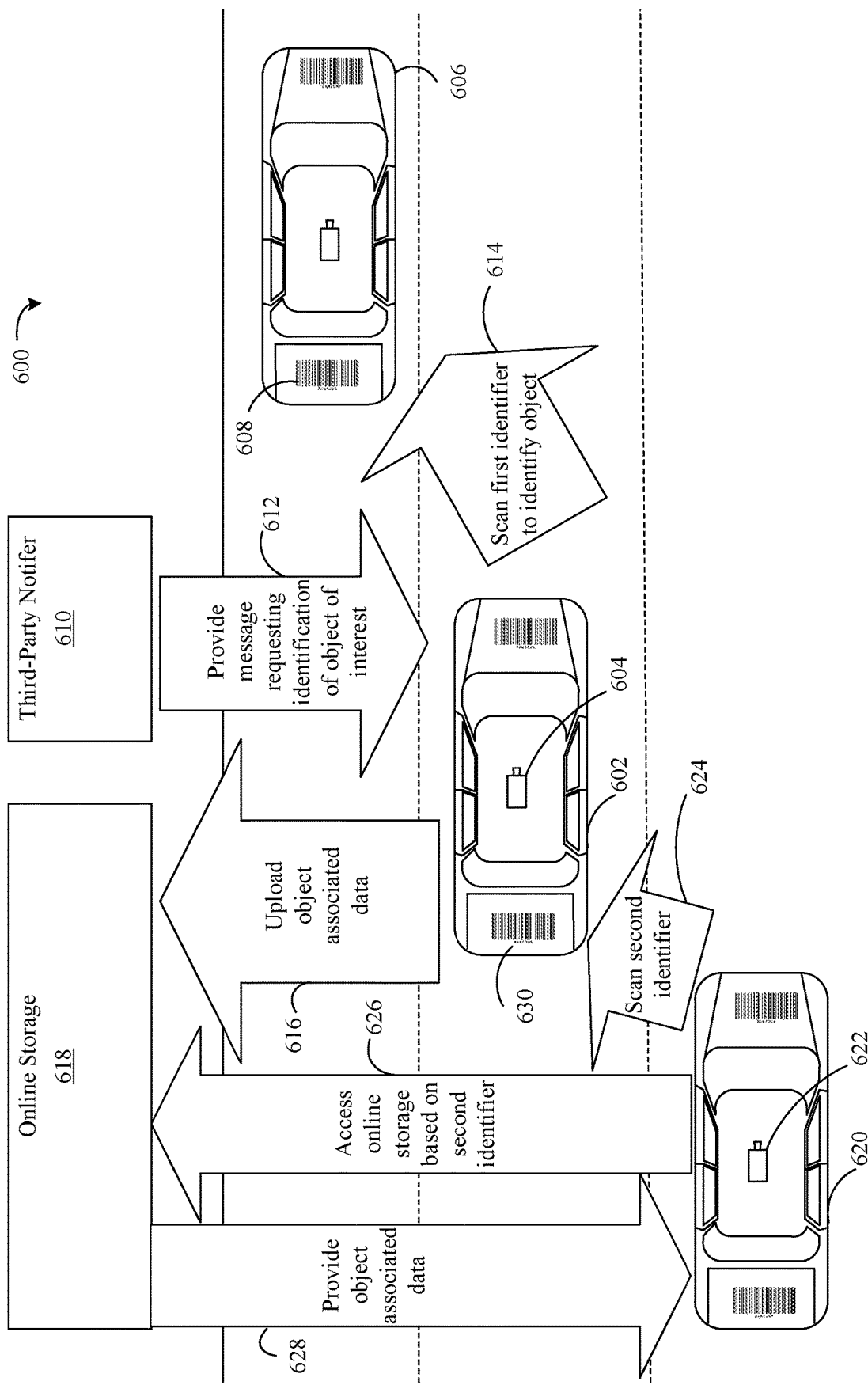
FIG. 6 is a diagram of an example of a crowd-sourced data gathering process according to an embodiment.

FIG. 6 illustrates a crowd-sourced data gathering process 600 in which a first vehicle 602, a second vehicle 606 and third vehicle 620 are travelling along a roadway. It should be noted that similar components and processes to those as already described will be omitted for brevity. Further, it should be noted that the embodiments of FIG. 6 are combinable with any of the embodiments described herein, for example the process 100 of FIG. 1, the method 200 of FIG. 2, the control system 300 of FIG. 3, the process 400 of FIG. 4 and the process 500 of FIG. 5.

As illustrated, a third-party notifier 610 may provide a message requesting identification of an object of interest 612. For example, the third-party notifier may be an authority (e.g., police, FBI, Department of Justice), company or any other type of entity that is executing a search. The message maybe an Amber Alert, or a message indicating that a pursuit is underway with an identification of the object of interest, or a company requesting tracking of a particular object. The message may include an identifier (e.g., barcode, QR code, license plate, etc.) that identifies the object of interest.

In this example, the first vehicle 602 chooses to participate in the search for the object of interest. Therefore, the first vehicle 602 may begin to scan for the object of interest. The first vehicle 602 may utilize the sensor 604 to scan a first identifier 608 to identify the object 614. That is, the first identifier 608 may correspond to the identifier transmitted in the message. Therefore, the first vehicle 602 will identify the second vehicle 606 as the object of interest in response to the first identifier 608, that is scanned by the first vehicle 602, corresponding the identifier transmitted in the message from the third-party notifier 610.

In response to the identification of the object of interest, the first vehicle 602 may upload object associated data 616 in the online storage 618. The object associated data may include a position of the object of interest, a time that the object of interest was identified, a number of passengers of the object of interest, any distinct physical characteristics of the object of interest, a velocity of the object of interest, a direction that the object of interest moved along, etc.

The third vehicle 620 may scan the second identifier 624, 630 with the sensor 622. The third vehicle 620 may access the online storage 618 based on the second identifier 630, 626. The online storage 618 may provide the object associated data 628 to the third vehicle 620. That is the online storage 618 stores the object associated data is stored in association with the second identifier 630. Thus, when the third vehicle 620 accesses data associated with the second identifier 630, the online storage 618 provides the object associated data 628.

Therefore, even though the third vehicle 620 cannot identify the second vehicle 606 because the second vehicle 606 is occluded by the first vehicle 602, the third vehicle 620 may nonetheless be made aware of the existence of the second vehicle 606 through the object associated data stored in the online storage 618 by the first vehicle 602. Thus, the third vehicle 620 may be assured that the second vehicle 606 is in front of the first vehicle 602 and respond accordingly, for example by accelerating and engaging the second vehicle 606.

Figure 7:
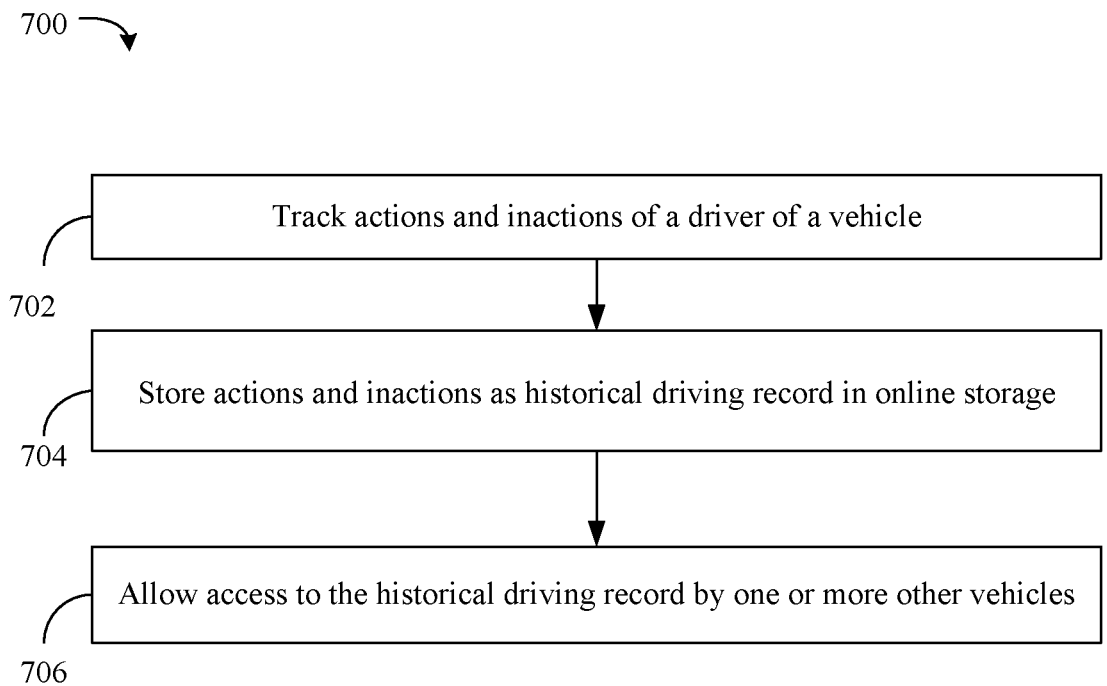
FIG. 7 is a flowchart of an example of a method of tracking actions of a driver to generate a historical driving record according to an embodiment.

FIG. 7 shows a method 700 of tracking actions of a driver to generate a historical driving record. The method 700 may generally be implemented in conjunction with any of the embodiments described herein, for example the process 100 of FIG. 1, the method 200 of FIG. 2, the control system 300 of FIG. 3, the process 400 of FIG. 4, the process 500 of FIG. 5 and the process 600 of FIG. 6. In an embodiment, the method 700 is implemented in logic instructions (e.g., software), configurable logic, fixed-functionality hardware logic, circuitry, etc., or any combination thereof.

Illustrated processing block 702 tracks actions of the driver of a vehicle. Not only does illustrated processing block 702 track actions taken by the driver, but it also detects the omission of some actions. For example, if the driver takes a right turn but never actuated the right turn signal, the failure to actuate the right turn signal (e.g., an inaction) may be recorded as well. In doing so, the historical driving record not only reflects the actions executed by the user but actions a user should have taken but did not. Illustrated processing block 702 may further detect dangerous actions taken by the driver, for example excessive speeding, failure to obey traffic laws (e.g., failure to stop at a red light) and so forth.

The actions and inactions of the driver of the vehicle may be stored. For example, illustrated processing block 704 stores the actions and the interactions as a historical driving record in an online storage. Illustrated processing block 706 allows access to the historical driving record by one or more other vehicles so that the other vehicles may be made aware of potential actions that driver is likely to take, or in the alternative inactions by the driver.

Figure 8:
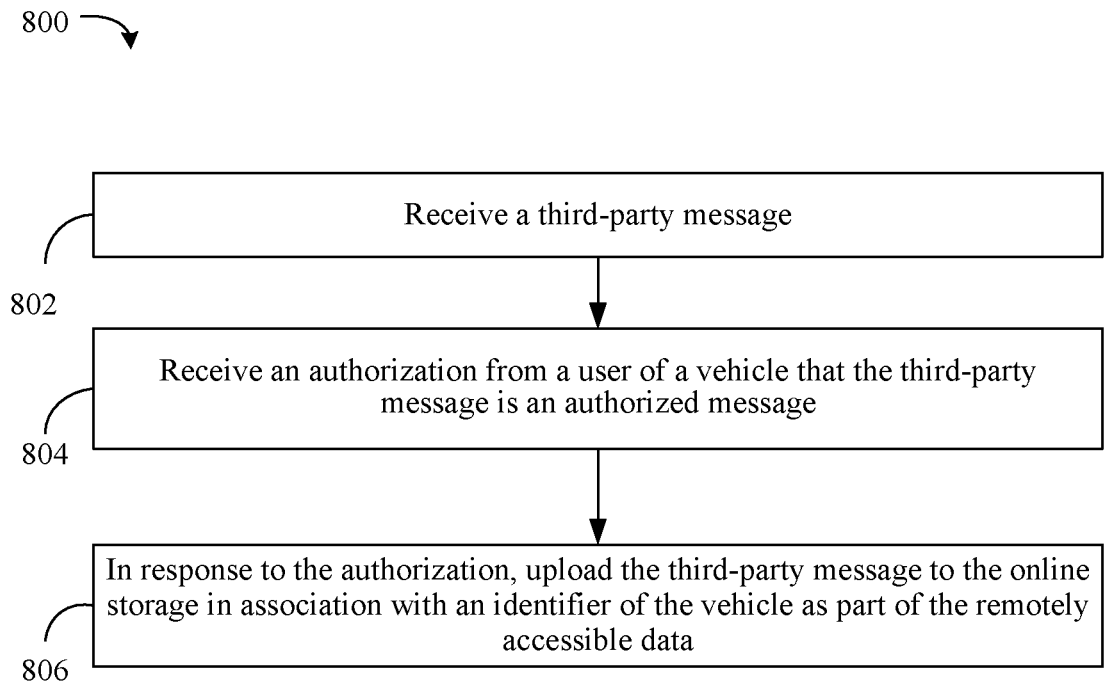
FIG. 8 is a flowchart of an example of a method of relaying on a third-party message through an online storage according to an embodiment.

FIG. 8 shows a method 800 of relaying a third-party message through an online storage. The method 800 may generally be implemented in conjunction with any of the embodiments described herein, for example the process 100 of FIG. 1, the method 200 of FIG. 2, the control system 300 of FIG. 3, the process 400 of FIG. 4, the process 500 of FIG. 5, the process 600 of FIG. 6 and the method 700 of FIG. 7. In an embodiment, the method 800 is implemented in logic instructions (e.g., software), configurable logic, fixed-functionality hardware logic, circuitry, etc., or any combination thereof.

Illustrated processing block 802 receives a third-party message (e.g., an advertisement) at a vehicle and/or at a device of the user. Illustrated processing block 804 receives an authorization from a user of the vehicle that the third-party message is an authorized message (e.g., that the user agrees to present the third-party advertisement as part of the remotely accessible data). Illustrated processing block 806 uploads the third-party message to the online storage in association with an identifier of the vehicle as part of the remotely accessible data. For example, the remotely accessible data may be stored in association with the identifier so that when the identifier is scanned by another vehicle, the third-party message may be retrieved from the online storage. It is to be noted, that method 800 may be implemented in a vehicle of the user or another device of the user, for example a mobile device a computing device a laptop, etc.

Figure 9:
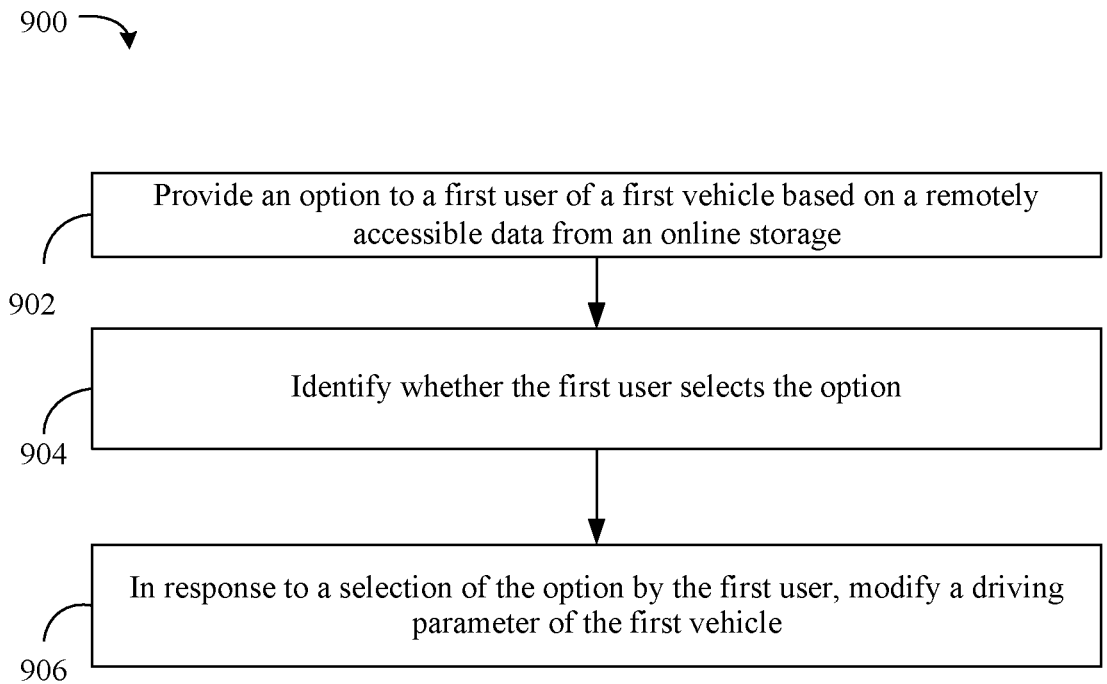
FIG. 9 is a flowchart of an example of a method of modifying through an online storage according to an embodiment.

FIG. 9 shows a method 900 of modifying through an online storage. The method 900 may generally be implemented in conjunction with any of the embodiments described herein, for example the process 100 of FIG. 1, the method 200 of FIG. 2, the control system 300 of FIG. 3, the process 400 of FIG. 4, the process 500 of FIG. 5, the process 600 of FIG. 6, the method 700 of FIG. 7 and the method 800 of FIG. 8. In an embodiment, the method 900 is implemented in logic instructions (e.g., software), configurable logic, fixed-functionality hardware logic, circuitry, etc., or any combination thereof.

Illustrated processing block 902 provides an option to a first user of a first vehicle based on a remotely accessible data from an online storage. For example, the remotely accessible data may include a message (e.g., an advertisement, a request, etc.) from a second user in a second vehicle. For example, and as described herein, the second user may have executed the method 800 to upload a third-party message as remotely accessible data to the online storage. The first vehicle may scan an identifier of the second vehicle to access the online storage and retrieve the third-party message. For example, the first vehicle may detect that the third-party message is an advertisement for a store. In such an embodiment, illustrated processing block 902 may provide an option to the first user requesting whether the first user desires to route to the store. In some embodiments, the remotely accessible data may include a request from the second user to modify a driving behavior (e.g., please let me into your lane, slow down, turn off the bright lights, etc.) controlled by an autonomous control of the first vehicle.

Illustrated processing block 904 identifies whether the first user selects the option. As noted, the option may include routing to a particular location based on the personal message and/or or modifying a driving behavior. In response to a selection of the option by the first user, illustrated processing block 906 modifies a driving parameter (e.g., destination for navigation, driving behavior or an autonomous vehicle, etc.) of the first vehicle.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A system comprising:
   a first road vehicle associated with a first user and including:
   a first control system including at least one first processor and at least one first memory having a set of instructions, which when executed by the at least one first processor, cause the first control system to:
   identify one or more driving factors associated with a potential future action of the first road vehicle,
   determine that the one or more driving factors are to be stored as remotely accessible data, and
   cause the remotely accessible data to be stored to an online storage in association with an identifier of the first road vehicle,
   a second road vehicle including:
   one or more sensors to scan the first road vehicle for the identifier of the first road vehicle, and
   a second control system coupled to the one or more sensors, wherein the second control system includes at least one second processor and at least one second memory having a set of instructions, which when executed by the at least one second processor, cause the second control system to:
   access the remotely accessible data on the online storage based on the identifier scanned from the first road vehicle by the second road vehicle, and
   cause at least part of the remotely accessible data to be presented to a second user of the second road vehicle and modify a driving parameter of the second road vehicle based on the remotely accessible data.

2. The system of claim 1, wherein the remotely accessible data is to include a historical driving record of the first user.

3. The system of claim 1, wherein the instructions of the at least one first memory, when executed, cause the first control system to:
   receive a third-party message;
   receive an authorization from the first user that the third-party message is an authorized message; and
   in response to the authorization, upload the third-party message to the online storage as part of the remotely accessible data.

4. The system of claim 1, wherein the instructions of the at least one first memory, when executed, cause the first control system to:
   identify navigation directions of the first road vehicle; and
   cause the navigation directions to be uploaded to the online storage as part of the remotely accessible data.

5. The system of claim 1, wherein the instructions of the at least one first memory, when executed, cause the first control system to:

identify one or more first road vehicle specific actions to automatically control a movement of the first road vehicle; and cause the one or more first road vehicle specific actions to be uploaded to the online storage as part of the remotely accessible data.

6. The system of claim 1, wherein the instructions of the at least one first memory, when executed, cause the first control system to:

identify an object-of-interest from a message;

analyze sensor data to identify the object-of-interest; and in response to the object-of-interest being identified, cause data associated with the object-of-interest to be uploaded to the online storage as part of the remotely accessible data.

7. The system of claim 1, wherein the instructions of the at least one second memory, when executed, cause the second control system to:

execute an authentication process to receive permission to access at least part of the remotely accessible data, wherein the at least the part of the remotely accessible data includes a personal message from the first user;

access the personal message when the permission is granted; and present the personal message to the second user of the second road vehicle.

8. The system of claim 1, wherein the instructions of the at least one second memory, when executed, cause the second control system to:

provide an option to the second user based on the remotely accessible data;

identify whether the second user selects the option; and in response to a selection of the option by the second user, adjust the driving parameter of the second road vehicle.

9. A system comprising:

a first road vehicle associated with a first user and including:

a first control system including at least one first processor and at least one first memory having a set of instructions, which when executed by the at least one first processor, cause the first control system to:

identify one or more driving factors associated with a potential future action of the first road vehicle, determine that the one or more driving factors are to be stored as remotely accessible data, and cause the remotely accessible data to be stored to an online storage in association with an identifier of the first road vehicle, a second road vehicle including:

one or more sensors to scan the first road vehicle for the identifier of the first road vehicle, and a second control system coupled to the one or more sensors, wherein the second control system includes at least one second processor and at least one second memory having a set of instructions, which when executed by the at least one second processor, cause the second control system to:

access the remotely accessible data on the online storage based on the identifier scanned from the first road vehicle by the second road vehicle, cause at least part of the remotely accessible data to be presented to a second user of the second road vehicle and modify a driving parameter of the second road vehicle based on the remotely accessible data, and adjust the driving parameter of the second road vehicle based on the remotely accessible data to adjust one or more of a speed of the second road vehicle, a position of the second road vehicle or a direction of the second road vehicle.

* * * * *